MAGNETIC MEMORY SYSTEMS

Filed Dec. 31, 1956 4 Sheets-Sheet 1

INVENTORS.
Vernon L. Newhouse &
William L. McMillan
BY Morris A. Rabkin
ATTORNEY.

INVENTORS.
Vernon L. Newhouse &
William L. McMillan
BY Morris [signature]
ATTORNEY.

INVENTORS.
Vernon L. Newhouse &
William L. McMillan
BY Morris A. Rabkin
ATTORNEY.

INVENTORS.
Vernon L. Newhouse &
William L. McMillan
BY Morris Rabkin
ATTORNEY.

United States Patent Office 2,933,720

Patented Apr. 19, 1960

2,933,720

MAGNETIC MEMORY SYSTEMS

Vernon L. Newhouse, Haddonfield, N.J., and William L. McMillan, Little Rock, Ark., assignors to Radio Corporation of America, a corporation of Delaware Application December 31, 1956, Serial No. 631,796

21 Claims. (Cl. 340—174)

This invention relates to memory systems, and particularly to memory systems using magnetic elements.

Extensive use is made in information-handling apparatus of magnetic core memories. Magnetic cores having substantially rectangular hysteresis loops are used. The rectangular hysteresis loop provides two stable remanent states of magnetization and also provides a nonlinear magnetization characteristic. A magnetizing force in excess of the static coercive force is applied to change the state of a core.

In certain of the prior magnetic core memories, coincident-current selection is used for both reading and writing information into the elements. In others of the prior systems, coincident-current selection is used only for writing information into the elements. The elements are arranged in an "$n$" dimensional coordinate system. Coincident-current selection involves applying separate excitations coincidentally to two or more of the "$n$" coordinates. The amplitudes of these excitations are limited such that only desired ones of the elements receive a net excitation in excess of their respective coercive forces. The remaining elements receive either zero excitation or an excitation less than their respective coercive forces.

It is known that the switching speed of rectangular hysteresis loop elements increases with increased amplitude of the applied excitation. Accordingly, the speed of the prior systems is limited because the amplitudes of the excitations are limited.

It is an object of the present invention to provide improved magnetic memory systems wherein selection is carried out by using time as one of the selecting dimensions, whereby excitations whose magnitudes exceed the coercive force of the magnetic cores can be used.

Another object of the present invention is to provide an improved memory system which is of faster speed than similar types heretofore known;

Still another object of the present invention is to provide improved methods of reading and writing information into desired cores of a magnetic memory system.

A further object of the present invention is to provide an improved random access magnetic memory system which does not require the application of coincident currents.

In the systems of the present invention, time is used as one of the selecting dimensions. In order to produce a change of state of magnetization in a core of rectangular hysteresis loop material, an excitation in excess of its coercive force is applied for a predetermined time. If the same excitation is applied for less than the predetermined time, the state of the core is not changed. However, if a plurality of these excitations, each of a duration less than the predetermined time, are applied successively to the core within a given time interval, then a permanent change is produced in the state of the core. Accordingly, by arranging the systems such that certain ones of the excitations are applied to one group of cores, and the remaining ones are applied to another group of cores, only a core common to both groups receives the requisite number of excitations within the given time interval. Consequently, only the common core has its state changed.

According to another aspect of the present invention, the speed of operation is increased even further by applying groups of several pulses each, of which alternate groups have pulses of one polarity, and the other alternate groups have pulses of the opposite polarity.

In the accompanying drawing, wherein like reference numerals are applied to like elements:

Fig. 1 is a schematic diagram of a two-dimensional memory system according to the invention;

Fig. 1*a* is a schematic diagram of a pulse-driver circuit useful in the system of Fig. 1;

Figs. 5 through 11, respectively, are each a schematic diagram of suitable pulse trains for obtaining the selection of a desired core of a memory matrix, according to the invention.

Figures 1, 1A, 2:
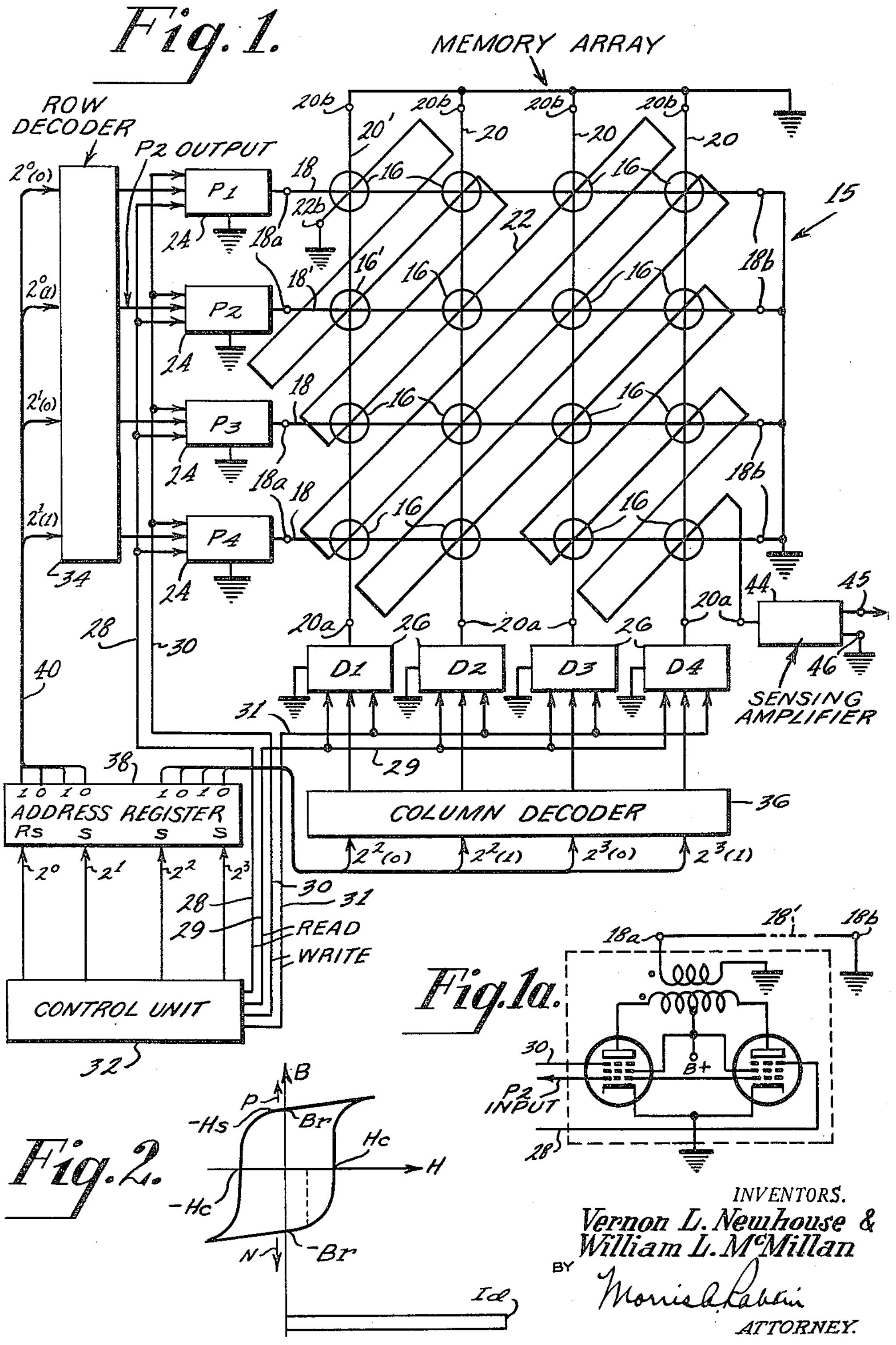
Fig. 2 is a graph of a substantially rectangular hysteresis loop of a core 16, Fig. 1.

The memory system of Fig. 1 has a two-dimensional array 15 of four rows and four columns of magnetic cores 16. For convenience of drawing, the cores 16 are indicated by circles. Each of the cores 16 may be of any suitable, substantially rectangular hysteresis loop material. Certain metallic materials such as 4–79 molybdenum-Permalloy exhibit a suitable rectangular hysteresis loop. All the cores of each row of the cores 16 is linked by a different one of four row windings 18. All the cores of each column of the cores 16 is linked by a different one of four column windings 20.

The end terminals **18*a* of the row windings 18 are connected respectively to four pulse-driver circuits 24 designated as $P_1$, $P_2$, $P_3$ and $P_4$. The other end terminals 18*b* of all of the row windings 18 are connected to a common reference source, indicated in the drawing by the conventional ground symbol. The end terminals 20*a* of the column windings 20 are each connected to a different one of four other pulse drivers 26 designated as $D_1$, $D_2$, $D_3$ and $D_4$. The other end terminal 20*b* of all the column windings 20** are connected to the common ground.

Each of the row and column drivers 24 and 26 may be similar and is arranged to apply drive pulses of the one or the other polarities to the row or column winding 18 or 20 to which it is connected. Each of the row and column drivers 24 and 26 has three inputs. A first input of each of the row drivers 24 is connected to a first bus 28 which is termed a first read bus 28; and a first input of each of the column drivers $D_1$–$D_4$ is connected to a second bus 29 which is termed a second read bus 29. A second input of each of the row drivers 24 is connected to a third bus 30 which is termed a first write bus 30; and a second input of each of the column drivers 26 is connected to a fourth bus 31 which is termed a second write bus 31. Each of the buses 28, 29, 30 and 31 is connected to a different one of four outputs of a control unit 32. The third inputs of the four row drivers $P_1$–$P_4$ are respectively connected to four outputs of a four-way row decoder unit 34. The third inputs of the column drivers $D_1$–$D_4$ are respectively connected to four outputs of another four-way column decoder unit 36.

Each of the decoder units 34 and 36 may be similar to each other and each may be a crystal diode decoder which operates to select a desired one of the four outputs in accordance with two binary inputs. The two binary inputs of order $2^0$ and $2^1$ for the row decoder 34 are supplied from two flip-flops of a four-flip-flop register unit 38. The two binary inputs of order $2^2$ and $2^3$ for the column decoder 36 are supplied from the other two flip-flops of the register unit 38. Each of the four flip-flops of order $2^0$, $2^1$, $2^2$ and $2^3$ of the register 38 may be a conventional flip-flop having two inputs, set "S" and reset "R," and two corresponding outputs "1" and "0." When a flip-flop is in a set condition, which is assumed in response to a positive pulse applied to its set input "S," its "1" output is high relative to its "0" output; and when a flip-flop is in a reset condition, which is assumed in response to a positive pulse applied to its reset input "R," its "0" output is high relative to its "1" output. The "1" and "0" outputs of the $2^0$ and $2^1$ flip-flops are connected, by way of a first digit cable 40, to the respective inputs of the row decoder 34; and the "1" and "0" outputs of the $2^2$ and $2^3$ flip-flops are connected, by way of a second digit cable 42, to the respective four inputs of the column decoder 36. The four set inputs "S" of the $2^0$–$2^3$ flip-flops of the register 38 are respectively connected to four outputs, designated $2^0$-$2^3$, of the control unit 32. The sixteen binary members expressed by the four binary digits of order $2^0$-$2^3$, inclusive, are employed to designate the sixteen memory cores 16. The four reset inputs of the flip-flops of the register 38 are connected to a common reset terminal R of register 38. The terminal R of register 38 receives a reset output of the control unit 32. The control unit 32 may be any suitable digital device, for example, a digital computer, adapted for supplying suitable signals to the memory system, as described hereinafter.

A sensing winding 22 links all the cores 16 of the array 15. One end terminal 22*a* of the sensing winding 22 is connected to the input of a sensing amplifier 44, and the other end terminal 22*b* of the sensing winding 22 is connected to the common ground. Sensing amplifier 44 (shown only as a block) may include any suitable integrating circuit, for example, an RC integrator, whose output is connected to the input of an electronic amplifier circuit. The output of the amplifier circuit of the sensing amplifier 44 is taken across the output terminals 45 and 46 may be supplied to any suitable utilization device (not shown).

In operation, information may be written into any desired one of the cores 16, for example the core 16′, at the intersection of the second row and the first column, as follows: The binary address of the core 16′ may be, for example, 0010. Initially, each of the flip-flops of the register 38 is in its reset condition. The address of the desired core 16′ is set into the register 38 by operating the control unit 32 to apply a setting signal to the set input of the $2^0$ flip-flop. Thus, the "1" output of the $2^0$ flip-flop is high relative to its "0" output, and the "0" output of each of the $2^1$, $2^2$ and $2^3$ flip-flops is high relative to each "1" output. The row decoder 34 and the column decoder 36 then apply an enabling signal to the pulse drivers $P_2$ and $D_1$, respectively. Each of the pulse drivers $P_1$, $P_3$, $P_4$, and $D_2$–$D_4$ has a relatively low-level signal applied thereto and each is, therefore, in an inactive condition.

For example, a suitable circuit for any of the pulse drivers 24 and 26 is shown, by way of example, in Fig. 1*a*, which is a diagram schematically illustrating the second pulse driver $P_2$. This second pulse driver $P_2$ may include a pair of pentode-type tubes having their anodes respectively connected to opposite end terminals of the primary winding of a center-tapped pulse transformer. The secondary winding of the pulse transformer is connected across the second row winding 18′. The control grids of the pair of pentode tubes are connected to the output (designated $P_2$ output) of the row decoder 34. The suppressor grid of one of the tubes is connected to the first read bus 28, and the suppressor grid of the other tube is connected to the first write bus 30. A suitable B+ supply may be connected, as shown, and suitable bias voltages are connected to the control and suppressor grids in known manner. Both pentodes are biased to be normally cut off. When the decoder $P_2$ output is high, a positive pulse applied to the first read bus 28 causes the right-hand tube in Fig. 1*a* to conduct and a positive-going pulse is produced in the coupled row winding 18′. When a positive pulse is applied to the first write bus 30, the left-hand tube of the pulse driver $P_2$ conducts and a negative-going pulse is produced in the coupled row winding 18′. Each of the other pulse drivers 24 and 26 may be arranged similarly to the pulse driver $P_2$, in a manner which will be apparent to those skilled in the art from the foregoing.

Continuing, now, with the description of the operation of the system of Fig. 1: At the beginning of each memory operation, the one-row pulse driver 24 and the one-column pulse driver 26, coupled to the row and column windings 18 and 20 of the desired core 16′, are enabled. The control unit 32 is next operated to apply to the first read bus 28 a plurality of spaced pulses in the form of a pulse train, for example, three positive-polarity pulses. These pulses are passed by the right-hand tube of the enabled row pulse driver $P_2$, and three positive-going pulses are applied to the second row winding 18′. The control unit 32 also applies to the second read bus 29 another plurality of spaced pulses in the form of another pulse train, for example, two positive-polarity pulses. These pulses are passed by the right-hand tube of the enabled column pulse driver $D_1$, and two positive-going pulses are applied to the first column winding 20′.

Figure 3:
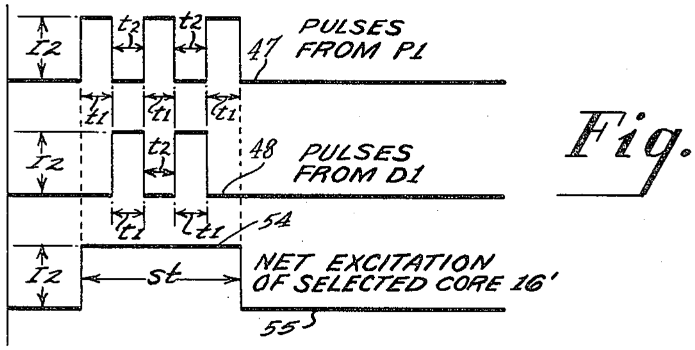
Fig. 3 is a timing diagram of waveforms of suitable pulse trains for operating the system of Fig. 1.

The upper waveforms 47 and 48 of the timing diagram of Fig. 3 respectively represent the two pulse trains. The group (or train) of three positive pulses 49, 50 and 51 of the uppermost waveform 47 are applied to the row winding 18′. Each of these pulses has an amplitude $I_2$, a duration $t_1$, and successive ones are spaced apart by a time $t_2$. The time intervals $t_1$ and $t_2$ may be equal, as shown in Fig. 3, or unequal, as described hereinafter. The group (or train) of two pulses 52 and 53 of the middle waveform 48 are applied to the column winding 20′. The pulses 52 and 53 of the second train are interlaced with the pulse pairs 49, 50 and 50, 51, respectively, of the first train. Each of the pulses 52 and 53 has an amplitude $I_2$ and a duration $t_1$, and are spaced apart by a time $t_2$. The resultant excitation applied to the desired core 16′ is indicated by the single, positive-current pulse 54 of the lowermost waveform 55. The pulse 54 is of an amplitude $I_2$ and has a duration $(3t_1+2t_2)$ or $5t$ if $t_1=t_2$. The pulse 54 generates an excitation sufficient to change the state of the desired core 16′.

Any one of the individual pulses 49—53 applied to the row and column windings 18′ and 20′ generates a magnetic field several times in excess of the static coercive field of any one of the cores 16, as described hereinafter. However, the duration of any single pulse is insufficient for it to produce a change of state in a non-selected one of the row and column cores 16. Any changes in the magnetization of a non-selected core 16 receiving a pulse 49—53 are "reversible" provided a suitable minimum duration is taken between successive pulses. A reversible change in magnetization is one such that the original condition is assumed by the magnetic material after removal of the unidirectional magnetizing force which initiated the change. Conversely, an irreversible change in magnetization is one such that the condition of the magnetic material is changed after the removal of the unidirectional magnetizing force which initiated the change. When a succession of pulses, say five, as in the above example, are applied to a core 16 within the minimum time duration, then an irreversible change of magnetization is produced in that core 16.

A graph of a hysteresis characteristic for one of the cores 16 is indicated in Fig. 2 by the curve 56. The two states of a core 16 are arbitrarily designated "P" and "N" and have corresponding remanent conditions $B_r$ and $-B_r$, respectively. These two conditions may respectively represent a binary "0" and a binary "1." For example, the state "N" may represent a binary "1" digit, and the state "P" may represent a binary "0" digit. The static coercive fields for a core 16 is indicated by the points $H_c$ and $-H_c$ at which the curve 56 intersects the "N" axis. The static coercive field $H_c$ may represent a first "threshold" field which must be exceeded before the state of a core can be changed.

The five positive pulses 49—53, for example, may write a binary "0" in the desired core 16' by changing it from the state N to the state P, unless the core 16' already is in the state P.

A binary "1" is written into the desired core 16' by applying two separate trains of negative-polarity pulses thereto. The control unit 32 is operated to apply three spaced pulses to the first write bus 30 and two spaced pulses to the second write bus 31. The enabled row and column pulse drivers $P_2$ and $D_1$ then pass these pulses as negative-polarity pulses to the selected row and column windings, such as the second row and first column windings 18 and 20'. These five negative pulses apply a continuous negative excitation to the desired core 16' of a time duration to change the core 16' from the state P to the state N. Again, any one of the negative pulses alone produces only reversible changes in magnetization in any non-selected core 16 of the second row and first column.

A binary "1" or "0" digit may be written into any other core 16 of the memory array 15 in similar fashion by operating the control unit 32 to set the $2^0$–$2^3$ flip-flops to the address of this other core 16.

Information stored in a desired core 16 can be read by operating the control unit 32 to apply the positive pulses 49—53 to that desired core 16. If the desired core 16 is in the state N, representing a binary "1," it is changed to the state P, thereby producing a relatively large voltage in the sensing winding 22. If the addressed core 16 already is in the state P representing a binary "0," a relatively small voltage is induced in the sensing winding 22. The non-selected cores 16 receiving the pulses 49–53 have reversible flux changes produced in each. These reversible flux changes, however, induce equal amplitude and alternate-polarity voltages in the sensing winding 22. Also, these alternating voltages are integrated by the RC integrator of the sensing amplifier 44, and substantially no contribution is made to the integrated signal by the non-selected cores 16.

In practice, each cycle of memory operation is divided into a read portion followed by a write portion. After the read operation, the addressed core 16 always is in one state, say P, representing a binary "0." Therefore, during the write portion of the cycle, signals are applied to the write buses 30 and 31 only when it is desired to write a binary "1" represented by the state N of the addressed core 16.

The mechanism that controls flux reversals in a rectangular hysteresis loop core, in response to the pulse trains, is not fully understood. However, the following is a simplified explanation of the response of a selected core, and of the lack of response of a non-selected core, to the applied pulse trains according to one theory. While the observed experimental results are substantially in accord with this theory, it is understood that the invention is not to be limited by the proposed theory of operation. However, it is believed that the theory affords a basis for the construction of apparatus according to the invention.

According to the domain theory of ferromagnetism, a core of ferromagnetic material is subdivided into discrete domains each having a magnetization vector. In a remanent state, say the $-B_r$ state, substantially all the domain vectors are oriented in the same direction. A reversal in the magnetism of a core may be accomplished by the movement of the boundary surfaces of the domains called "domain walls" under the influence of the applied field. In the present invention, the cores may be made from rectangular hysteresis loop material, such as ultra-thin molybdenum-Permalloy tape, so that the effects of eddy currents on the domain geometry and on domain-wall movements are negligible. When the applied field approaches a threshold value $H_m$, near the "knee" of the hysteresis curve 56 of Fig. 2, a rapid increase occurs in the rate of change of magnetization with an increasing magnetizing force. The sharp increase in the rate of change of magnetization is attributed to the formation or "nucleation" of reversal domains around imperfections in the material, particularly around grain boundaries. The velocity of domain-wall movements, due to the applied field, is limited by a so-called "damping" factor. The reason for the presence of a damping factor is not pertinent here, but it appears to exist even in the absence of eddy currents. The domain walls, therefore, have a finite speed of motion. If the applied field is removed before the reversal domains have reached a critical minimum size, the reversal domains collapse upon themselves and the core returns to its initial remanent condition. Consequently, even when the applied field of amplitude $H_2$ exceeds the static coercive field $H_c$ of the core, the changes in the magnetism produced in the core are substantially completely reversible provided the field $H_2$ is applied for a time less than the minimum time required for the reversal domains to reach the critical size. Accordingly, for short-duration pulses $I_2$, a core 16 effectively has a second threshold above which irreversible changes in magnetization take place. In the system of Fig. 1, for example, the minimum time corresponds to the duration $t_1$ of the selecting pulses of amplitude $I_2$. For pulses af amplitude increasingly greater than the amplitude $I_2$, up to a limit as described hereinafter, the minimum time becomes decreasingly shorter.

The time interval $t_2$, between successive pulses of the first and second pulse trains, corresponds to the time required for the reversal domains to collapse upon themselves. However, if another magnetizing force is applied before the reversal domains, due to a preceding field, have collapsed, the reversal domains started by the preceding magnetizing force grow in size and merge with each other. Eventually, the reversal domains extend over the entire core under the action of a succession of such applied magnetizing forces. For example, the five magnetizing forces applied by the five successive pulses of the system of Fig. 1 change the selected core from one remanent state $-B_r$ to the other remanent state $B_r$.

Figure 4:
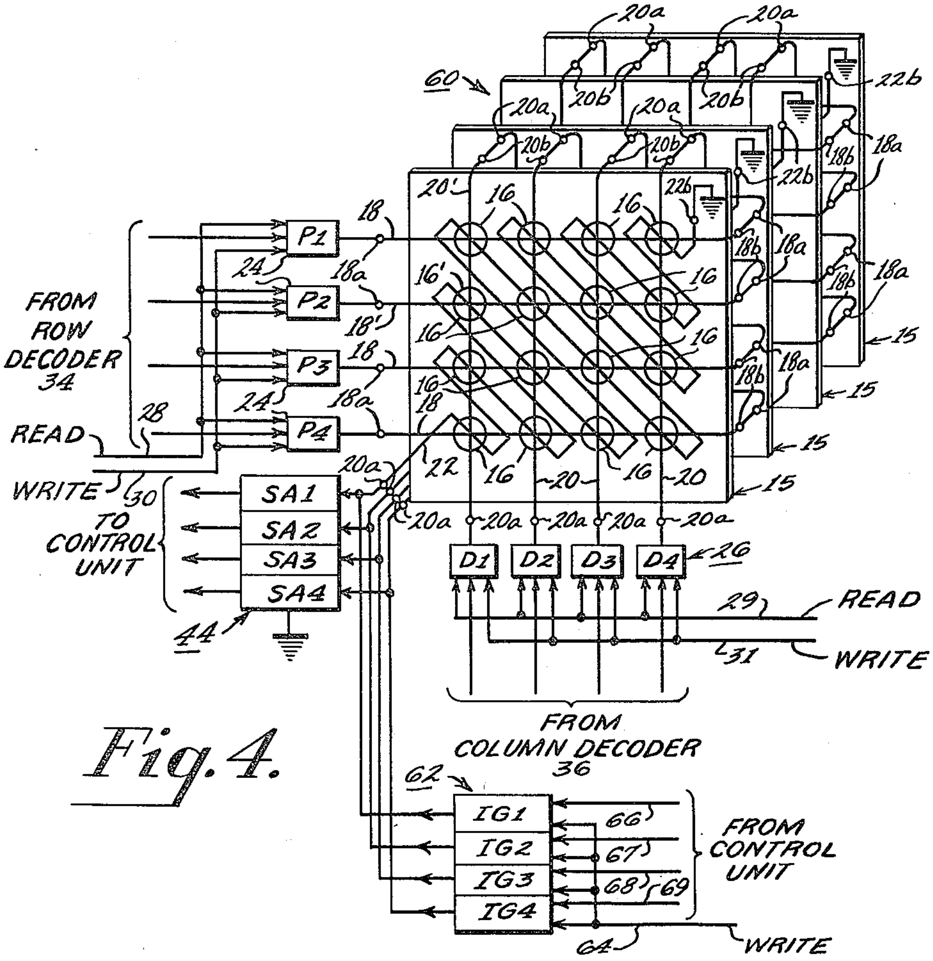
Fig. 4 is a schematic diagram of a three-dimensional memory system according to the invention.

The present invention may be applied to a three-dimensional memory array 60 of magnetic cores, as illustrated in Fig. 4. The array 60 of Fig. 4 includes four of the arrays 15 of Fig. 1. The cores 16 located in corresponding positions in each of the arrays 15 are aligned with each other. The row and column windings 18 and 20 of one array 15 are respectively connected in series with the row and column windings 18 and 20 of the next array 15, etc. For example, the terminals **18*b* of the first array 15 row windings 18 are connected to the terminals 18*a* of the next array 15 row windings 18, etc. The terminals 18*a* of the first array row windings 18 are connected respectively to the outputs of the row pulse drivers $P_1$–$P_4$, and the terminals 18*b* (not visible in Fig. 4) of the last array 15 row windings 18 are connected to the common ground. The terminals 20*a* of the first 15 column windings 20 are respectively connected to the outputs of the column pulse drivers $D_1$–$D_4$ and terminals 20*b* of the last array 15 column windings 20** are connected to the common ground.

A separate one of four sensing amplifiers 44, designated $SA_1$, $SA_2$, $SA_3$ and $SA_4$, is connected to the terminal **22*a* of each different sensing winding 22. All the terminals 22*b* of the sensing windings 22** are connected to the common ground. Each separate one of four inhibit gates 62, designated $IG_1$, $IG_2$, $IG_3$ and $IG_4$, has its output connected to a different one of the sensing winding terminals 22*a*. Each inhibit gate 62 has two inputs and a single output. A first input of each inhibit gate 62 is connected to a third bus 64 which is termed a third write bus 64. A second input of each inhibit gate 62 is connected to a different one of four digit signal lines 66, 67, 68 and 69, respectively. The third write bus 64 and each of the digit lines 66—69 may be connected to a control unit, such as the control unit 32 of Fig. 1.

In operation, during the read portion of the memory cycle, the operation is the same as that of the system of Fig. 1; and a corresponding core 16 in each of the arrays 15, for example the core 16', is changed to the state P unless it already is in that state. Substantially no change in the magnetization of any of the other cores 16 of the second row and first column of cores of an array 15 is produced. The output signal induced in the sensing winding 22 of the first array 15 is used to activate the first sensing amplifier $SA_1$, and so on.

During the write operation, however, an additional pulse train is applied to the sensing windings 22 of those arrays 15 in which it is desired to store a binary "0," represented by the state P.

Figure 5:
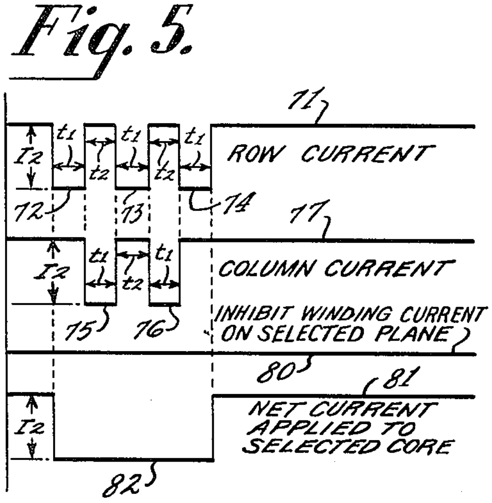
Figure 6:
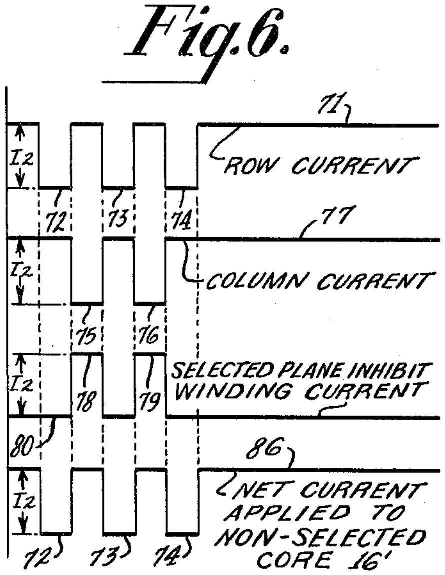

The waveforms of Figs. 5 and 6 illustrate the pulse trains used for writing binary "1" and "0" digits into desired ones of the selected cores 16' of the array 60. After the read operation, each of the desired cores 16' is in the state P. The waveforms of Fig. 5 illustrate the pulse schedule used for writing a binary "1" digit in a desired core 16' by changing the core 16' to the state N. The uppermost waveform 71 of Fig. 5 illustrates the three negative pulses 72, 73 and 74 applied to the second row winding 18' of each array 15 by the pulse driver $P_2$. The two interlaced negative pulses 75 and 76 of the next lower waveform 77 illustrate the two pulses applied to the first column winding 20' of each array 15. Each of the pulses 72—76 has an amplitude $I_2$, a duration $t_1$, and successive pulses of a train are spaced apart by a time $t_2$. These two trains of negative pulses of the waveforms 71 and 77 together generate sufficient excitation, illustrated by the negative pulse 82 of the bottom waveform 81, to change any core 16' from the state P to the state N. After the application of the pulses shown in the waveforms of Fig. 5, the desired cores 16' receiving only negative pulses are in the state N, representing a binary "1."

If it is desired to write a binary "0" into a desired core 16', the pulse schedule illustrated by the waveforms of Fig. 6 is employed. As shown in Fig. 6, a third pulse train comprising two positive-polarity, inhibit pulses 78 and 79, illustrated in the waveform 80 (third from the top), is applied by enabled ones of the inhibit gates 62 to the sensing windings 22 coincidentally with the negative-polarity pulses 75 and 76 applied to the column windings 20'. The inhibit gates 62 are enabled by signals applied to the digit lines 66, 67, 68 and 69 of the inhibit gates $IG_1$, $IG_2$, $IG_3$ and $IG_4$, corresponding to the arrays 15 in which it is desired to write a binary "0." The third train of pulses is applied by the control unit 32 to the third write bus 64 and is passed by the enabled ones of the inhibit gates 62 to their connected sensing windings 22. The pulses 78 and 79 are each of an amplitude $I_2$, a duration $t_1$, and are spaced apart by a time $t_2$. Accordingly, the third pulse train generates magnetic fields that effectively cancel the magnetic fields generated by the column pulses. The net negative excitation applied to a desired core 16' receiving a binary "0" is indicated in the lowermost waveform 86 of Fig. 6 by the three spaced, negative pulses 72, 73 and 74 of the first pulse train. Each of these three pulses produces only reversible changes in the magnetization of a desired core 16' receiving them, as described in connection with the system of Fig. 1. However, those of the selected cores 16' that do not receive the inhibit pulses are changed from the state P to the state N by the first and second pulse trains, as described for the waveforms of Fig. 5.

Any other group of four cores 16 can be selected in like fashion by operating the row register 38 (Fig. 1) and the control unit 32 to activate the corresponding pulse drivers 24 and 26 and the inhibit gates 62. If desired, a separate inhibit winding (not shown) may be linked to all the cores 16 in each different array 15. In such case, each separate inhibit winding is connected to the output of a different inhibit gate 62 in known fashion.

Figure 7:
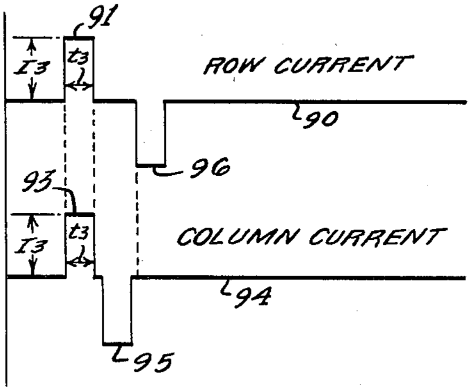

Faster operating speeds can be achieved by using trains of larger-amplitude drive pulses where successive pulses of a train are of alternating polarity. In such case, the individual pulses each have an amplitude $I_3(I_3>I_2)$ sufficient to produce irreversible changes of magnetization in a non-selected one of the cores. However, the succeeding opposite-polarity pulse of amplitude $I_3$ of a train returns the non-selected core to its initial remanent state. A desired core 16 may be selected by applying corresponding pulses of the pulse trains coincidentally, or by applying certain of the pulses coincidentally and staggering the remaining pulses. For example, the waveforms of Fig. 7 illustrate one pulse schedule for operating the two-dimensional system of Fig. 1 using two pulse trains where successive pulses of a train are of opposite-polarity. The control unit 32 (Fig. 1) applies a positive pulse to the first read bus 28, and the enabled row driver 24 then applies a positive pulse, indicated by the pulse 91 of the upper waveform 90 of Fig. 7, to the row winding 18 connected to that row driver 24. The first positive pulse 91 has an amplitude $I_3$ and a duration $t_3$. The amplitude $I_3$ is larger than the amplitude $I_2$ and the time interval $t_3$ may be the same as the time interval $t_1$ for the pulses illustrated in the waveforms of Fig. 3. At the same time, the control unit 32 (Fig. 1) applies a pulse to the second read bus 29, and the enabled column driver 26 applies a positive pulse, indicated by the pulse 93 of the lower waveform 94 of Fig. 7, to the column winding 20 connected to that column driver 26. The second pulse 93 also has an amplitude $I_3$ and a duration $t_3$. The two positive pulses 91 and 93 together generate a magnetizing field of sufficient intensity to change the selected core 16 from the state N to the state P in the time interval $t_3$. Each of the positive pulses 91 and 93 alone generates a magnetic field of insufficient intensity to change a non-selected core 16 from the state N to the state P in the time interval $t_3$. However, a pulse 91 or 93 is of sufficient amplitude to produce irreversible changes of magnetization in a non-selected core 16, as described hereinafter. The control unit 32 (Fig. 1) is next operated to apply a pulse to the second write bus 31 and the enabled column driver 26 applies a negative pulse 95 of the lower waveform 94 of Fig. 7 to the column winding 20 connected to that column driver 26. This negative pulse 95 is of an amplitude $I_3$ and has a duration $t_3$. This pulse 95 generates a magnetic field of sufficient intensity to return each non-selected core 16 of the selected column substantially to its initial remanent condition. A relatively small change of magnetization also is produced in the selected core 16 by the pulse 95, but the selected core remains in the P state after the pulse 95 is terminated. At some later time, the control unit 32 applies a pulse to the first write bus 30, and the enabled row driver 24 applies a negative pulse 96 of the upper waveform 90 of Fig. 7 to the row winding 18 connected to that row driver 24. The pulse 96 also has an amplitude $I_3$ and a duration $t_3$. The non-selected cores 16 of the selected row are each returned to their respectice initial remanent condition by the pulse 96. Another relatively small change in the magnetization of the selected core 16 also is produced by the negative row pulse 96. However, after termination of the pulse 96, the selected core 16 remains in the state P.

The information stored in a selected core 16 can be ascertained by reversing the polarities of the respective pulses 91, 96 and 93, 95 and observing the amplitude of the resulting voltage induced in the sensing winding 22.

Each of the selecting pulses applied in the pulse schedule operation just described generates a magnetic field $H_3$ which exceeds the static coercive field $H_c$ of any of the cores 16, and which also exceeds the field $H_2$ generated by the selecting pulses of the mode of operation previously described using interlaced trains of pulses. In order to account for the observed operation of these systems using selecting pulses of amplitudes $I_3$, the following additional theory is presented in simplified form. Again, it is to be understood that the invention is not to be limited by the theory set forth.

In metallic rectangular loop materials, the process of magnetization reversal for applied fields of twice the coercivity is thought to take place mainly by domain-wall movement, as described hereinbefore.

In ferromagnetic materials made up of particles which are so small that domain walls cannot exist in them, as in certain permanent magnet materials, the process of magnetization reversal is considered to take place mainly by "spin rotation"; i.e., by a rotation of the electron spins from their original directions into directions which are parallel, or nearly parallel, to those of the applied field. In the absence of an external field, the orientation of the magnetization within an individual particle is determined by the particle shape, its state of strain, and its crystal structure. For an unstrained spherical particle not subject to the influence of a field, the direction of magnetization will initially be along one of the so-called "easy directions" of the crystal lattice. If a slowly-rising external field is now applied in the opposite direction to that assumed by the magnetization, the direction of the spin will remain anti-parallel; that is, parallel to, but in a direction opposite to, that of the external field until that field passes a value dependent on certain constants of the material. In one of the simplest cases, the critical value of the external field is $2K/I_s$, where K is the anisotropy constant and $I_s$ is the saturation magnetization of the material. As soon as the external field increases past this critical value, the carriers of magnetic moment throughout the particle rotate through 180° into a direction parallel to, and in the same direction as, the applied field. This new direction is now a favored direction of magnetization in the absence of an applied field, and if the external field is decreased to zero, the magnetization will remain anti-parallel to the original direction. Under the above conditions, where the applied field is parallel to the "easy direction" of magnetization, a completely rectangular hysteresis loop is thus obtained.

The theory just described accounts for that fact that, in certain permanent magnet-particle materials, where magnetization by domain-wall movement is impossible because of the small size of the particles, approximately rectangular hysteresis loops are obtained. Magnetization reversal takes place by "spin rotation" and the overall coercivity is a function of an internal field related to particle shape and to the properties of the material.

In the case of the materials under consideration in the present invention, magnetization reversal at low fields takes place mainly by domain-wall movement.

Materials which have a rectangular hysteresis loop are characterized by a coercivity which may be measured by known procedures. This coercivity is the "static coercivity," so-called because it is measured with steadily-applied or slowly-varying magnetic fields. The static coercivity is dependent upon the hindrances to wall motion offered by the imperfections of the magnetic material.

Consider now the theory of magnetization reversal when the field is applied in the form of very short pulses. It has been found experimentally, as described above, that if these pulses produce fields that are below a certain intensity $H_2$, where $H_2$ may be greater than the static coercivity, no appreciable permanent magnetization change occurs after a train of these pulses. This effect is taken advantage of in the mode of operation, first described, using pulse trains. However, applied pulses of short duration which together produce a field parallel to the "easy direction," but in excess of a third threshold $2H_3$, reverses the magnetization of the core virtually completely. It has been found experimentally that pulses producing fields of an intensity of approximately $H_3$ do not produce any appreciable change of magnetization in a core provided that each positive pulse is followed by an approximately equal negative pulse, and vice versa. Also, several successive, positive pulses can be followed by several negative pulses, and vice versa, without producing appreciable net changes in the magnetic state of a core.

Accordingly, under conditions of pulse excitation, certain rectangular loop materials thus exhibit a third threshold $2H_3$ of magnetization which can be used for selecting a core by means of very short pulses. This means of core selection is to be distinguished from the conventional means of core selection using broad, half-amplitude pulses producing fields less than the static coercivity.

The field $2H_3$ may be identified with the internal field of the material. Recall that the internal field governs magnetization reversal in the small-particle case. In the small-particle case, however, no domain-wall motion exists. In the materials employed in the present invention, however, domain walls do exist and govern the magnetization reversal of a core at low applied fields of an intensity much less than the internal field. At fields $2H_3$, of the order of the internal field of the core, magnetization reversal in the present materials is thought to take place mainly by "spin rotation." For applied fields of the order of $H_3$, no appreciable, permanent "spin rotation" occurs; and, provided the applied pulses are sufficiently short, the domain walls which exist are moved over such a short distance that an equal and opposite field $H_3$ suffices to return them to a point close to their original position, a point so close that no cumulative wall movements are caused by a succession of such fields. Furthermore, any new domains which are created by a field of one direction of amplitude $H_3$ tending to reverse the core magnetization are either reabsorbed by the oppositely-directed field of amplitude $H_3$ or, if not, do not grow cumulatively after a succession of such fields.

The experimental facts relating to the third threshold $2H_3$ of square loop materials have thus been explained in terms of "spin rotation," a mechanism which is thought to exist in the case of small-particle, permanent magnetic materails. It is thought unlikely that the "spin rotation" in rectangular loop materials takes place by means of the homogeneous rotation of the spins in a large body of material. What is believed most likely is that, as the threshold field $2H_3$ is approached, "spin rotation" occurs independently in areas surrounding imperfections in the material such as grain boundaries.

As the applied reversal field exceeds the threshold field $2H_3$, the nucleation process described hereinbefore occurs spontaneously throughout the material, creating domains of reversed magnetization which finally merge by wall movement. On this basis, the nucleation of reversal domains should become important only for a relatively narrow region of applied fields near the threshold field $2H_3$ and much larger than the static coercivity of the core.

Figure 8:
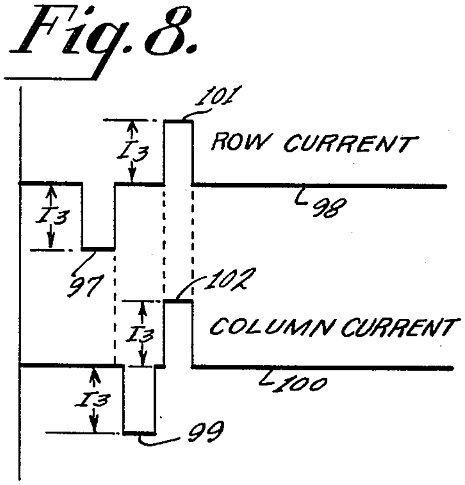
Figure 9:
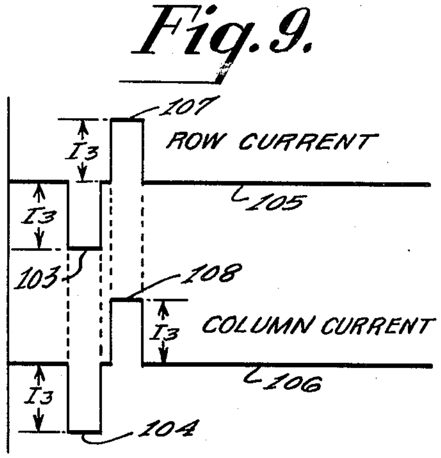

The waveforms of Figs. 8 and 9 illustrate other pulse schedules for operating a two-dimensional memory system using pulse trains, including opposite-polarity pulses. The pulse schedule illustrated in Fig. 8 is advantageous over that illustrated by the waveforms of Fig. 7 in that the selected core 16′ does not have any disturbing pulses applied to it after its state is changed. Thus, the negative pulse 97 of the upper waveform 98 is applied and terminated before the initiation of the negative pulse 99 of the lower waveform 100. The negative pulses 97 and 99 each have an amplitude $-I_3$ and a duration $t_3$, and are produced on the selected row and column windings by operating the control unit 32 (Fig. 1) to apply corresponding pulses to the first and second write buses 30 and 31, respectively. Each of the negative pulses 97 and 99 produces a relatively small, irreversible change of magnetization in the cores of the selected row and column that are in the state P. Those of the cores of the selected row and column that are in the state N have reversible magnetization changes produced by the negative pulses 97 and 99. The control unit 32 is then operated to apply pulses coincidentally to the first and second read buses 28 and 29, thereby producing the positive-polarity pulses 101 and 102 of the waveforms 98 and 100 on the selected row and column windings. Each of the positive pulses 101 and 102 has an amplitude $I_3$ and a duration $t_3$. Upon termination of the positive pulses 101 and 102, the selected core 16 is in the state P. Each of the non-selected cores 16 of the row and column that had an irreversible change of magnetization produced by a prior, negative pulse, i.e., those that are in the state P, now is returned to its initial remanent condition. Each of the non-selected cores 16 that had a reversible change of magnetization produced by the prior negative pulse, i.e., those that are in the state N, now has a relatively small, irreversible change of magnetization produced by one of the positive pulses 101 and 102. Note, however, that the negative pulse of a succeeding cycle of selection pulses returns these last-mentioned, non-selected cores to their initial remanent condition.

In the pulse schedule illustrated in the waveforms of Fig. 9, the advantage of the pulse schedule illustrated in Fig. 8 are retained and, in addition, faster operation is achieved. Corresponding pulses of the two different pulse trains are applied coincidentally. Thus, the negative-polarity pulses 103 and 104 and the positive-polarity pulses 107 and 108, of the upper and lower waveforms 105 and 106, are applied coincidentally to the row and column windings of the desired core 16′. Each of the pulses has an amplitude $I_3$ and has a duration $t_3$. In such case, the desired core 16′ is first changed from the state P to the state N, unless it already is in the state P, and then is changed from the state N to the state P. Each of the non-selected cores is essentially in its initial remanent condition after the trains of pulses are terminated. By reversing the polarities of the respective pulses 103, 104, 107 and 108, of Fig. 9, a desired core 16′ can be changed from the state N to the state P, unless it already is there, and then changed from the state P to the state N.

Figure 10:
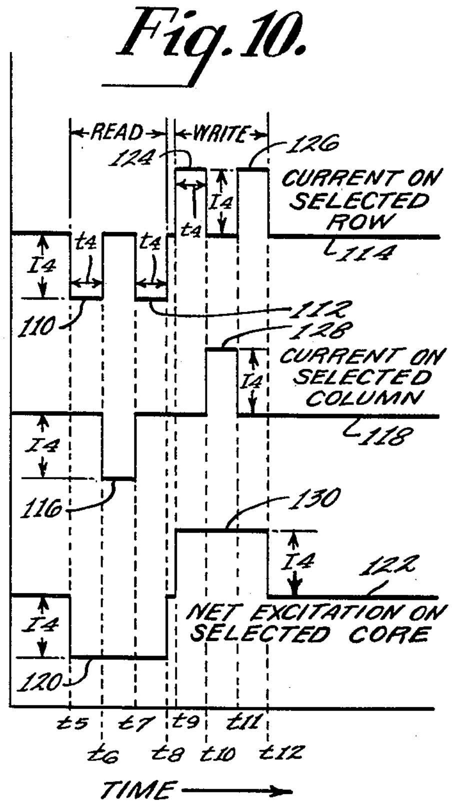

The waveforms of Fig. 10 illustrate another suitable pulse schedule, according to the invention, for reading information out of, and writing information into, selected cores of a two-dimensional memory array, and taking advantage of both the second and third threshold effects described above. Referring to Fig. 10, each memory cycle is divided into two portions, read and write. During the read portion of the memory cycle, for example, two spaced, negative pulses 110 and 112 of the top waveform 114 are applied to the row winding 18 (Fig. 1) of the selected core 16. Each of the pulses has an amplitude $I_4$ and a duration $t_4$. The pulse amplitude $I_4$ is larger than the pulse amplitude $I_2$ at which the second threshold appears but less than the pulse amplitude $2I_3$ at which the third threshold appears. The duration $t_4$ of the pulses of Fig. 10 may be equal to, or different from, the duration $t_3$ of the pulses of Figs. 7 through 9, or equal to, or different from, the duration $t_1$ of the pulses of Figs. 3, 5 and 6. The first pulse 110 is initiated at time $t_5$ and is terminated at time $t_6$, and the second pulse 112 is initiated at time $t_7$ and terminated at time $t_8$. Between the time $t_6$, when the first pulse 110 is terminated, and the time $t_7$ when the second pulse 112 is initiated, a negative pulse 116 having an amplitude $I_4$ and a duration $t_4$ is applied to the column winding 20 (Fig. 1) of the selected core 16. The negative column pulse 116 is shown in the middle waveform 118 of Fig. 10. The excitation received by the selected core 16 is illustrated by the negative pulse 120 of the bottom waveform 122. The pulse 120 begins at the time $t_5$ and ends at the time $t_8$. The selected core 16 (Fig. 1) receiving the pulse 120 is changed from the state P to the state N, unless it is already in the state N. The stored information is determined as before by observing the amplitude of the voltage induced in the sensing winding 22 at the sensing amplifier 44 of Fig. 1. After the read portion of the memory cycle, the selected core 16 is in the state N.

An advantage of the pulse schedule illustrated in Fig. 10 is that the position of the column pulse 116, relative to the row pulses 110 and 112, is not critical. The column pulse 116 can be initiated at any time in the time interval between the times $t_5$ and $t_8$. In one illustrative embodiment of a two-dimensional memory array, at one extreme the column pulse 116 was initiated coincidentally with the first row pulse 110 and, at the other extreme, the column pulse 116 was initiated coincidentally with the second row pulse 112.

During the write portion of the memory cycle, if it is desired to change the state of the selected core 16, then a series of spaced, positive pulses are applied to the row and column windings of the selected core 16, as described for the spaced negative pulses. However, if it is desired to leave the selected core in the state N, then the positive column pulse is not applied until after the second positive row pulse is terminated.

Assume that it is desired to change the state of the selected core 16′. Referring again to Fig. 10, two spaced, positive row pulses 124 and 126 of the top waveform 114, and a positive column pulse 128 of the middle waveform 118 are generated. The first positive row pulse 124 is initiated at a time $t_9$ and terminated at a later time $t_{10}$. The positive column pulse 128 is initiated at the time $t_{10}$ and is terminated at a later time $t_{11}$. The second positive row pulse 126 is initiated at the time $t_{10}$ and is terminated at a time $t_{11}$. The positive-current pulse 130 of the bottom waveform 122 represents the excitation received by the selected core 16. The selected core 16 is thus changed from the state N to the state P. Each of the positive row pulses 124 and 126, and the column pulse 128, has an amplitude $I_4$ and a duration $t_3$. Again, the position of the column pulse 128 relative to the row pulses 124 and 126 is not critical. Note that, because the amplitude $I_4$ of the pulses exceeds the amplitude $I_2$, some irreversible magnetization changes are produced in the non-selected cores 16 of the row and column, including the selected core 16. However, the successive, positive row pulses 124 and 126 substantially cancel any irreversible magnetization changes produced in the non-selected cores of the row by the preceding negative pulses 110 and 112. Likewise, the positive column pulse 128 substantially cancels any irreversible magnetization changes produced in the non-selected cores of the column by the preceding negative pulse 116. When it is desired to leave the selected core 16 in the state N, the initiation of the positive column pulse 128 is delayed for an additional time $t_4$, after the time $t_{12}$, when the second row pulse 126 is terminated, so that the selected core 16 remains in the state N.

Figure 11:
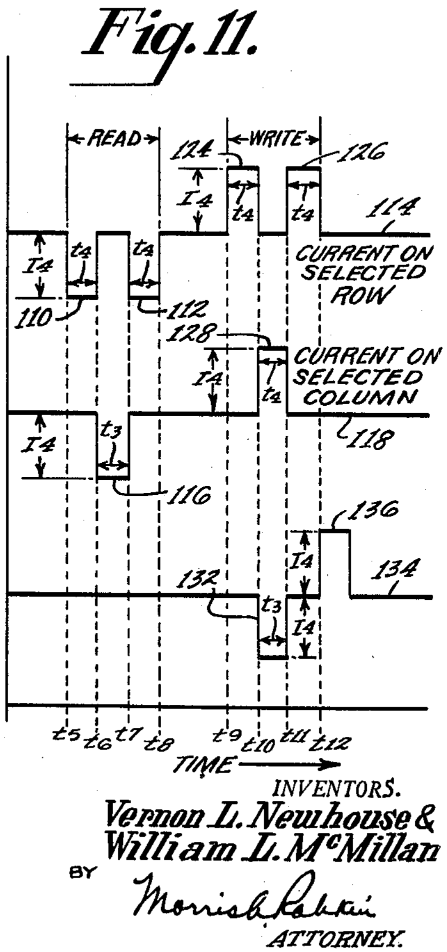

The waveforms of Fig. 11 illustrate the extension of the pulse schedule of Fig. 10 to a three-dimensional memory system such as the system shown in Fig. 4. In the three-dimensional system, the read portion of the memory cycle may be similar to that for a two-dimensional system. Thus, after the read operation is completed, each selected core receiving the negative row pulses 110 and 112, and the negative column pulse 116, is in the state N. The information stored in the desired cores is ascertained by observing the amplitude of the signals induced in the separate sensing windings. However, during the write portion of the memory cycle, a pair of opposite-polarity pulses are applied to the sensing (now inhibit) windings 22 of those arrays 15 in which it is desired to leave the selected core in the state N, and no pulses are applied to the sensing (now inhibit) windings 22 of those arrays 15 in which it is desired to change the state of the selected core. The first inhibit pulse, illustrated by the negative pulse 132 of the waveform 134 (second from the bottom), is initiated at the time $t_{10}$ coincidentally with the initiation of the positive column pulse 128 and is terminated at the time $t_{11}$ coincidentally with the termination of the column pulse 128. Accordingly, the negative inhibit pulse 132 substantially cancels the effect of the positive column pulse 128 in a desired core 16' receiving both pulses. The two positive row pulses 124 and 126 each are of insufficient magnitude to change a selected core 16 from the state N to the state P. Thus, those cores which also receive negative inhibit pulses 132 remain in the state N. The succeeding positive inhibit pulse 136 is initiated at a time $t_{12}$ after the second positive pulse 126 is terminated and serves to cancel any irreversible magnetization changes produced in the non-selected cores 16 of an array 15 due to the preceding negative inhibit pulse 132.

In one specific illustrative embodiment of a two-dimensional memory matrix according to the invention, the cores 16 each were wound from five wraps of 4–79 molybdenum-Permalloy tape ⅛ of a thousandth of an inch thick. The inside diameter of each core 16 was approximately 0.125 inch. Each of the row windings 18 and the column windings 20 was provided with five turns on each core 16 linked thereby. The data on similar commercial cores show that a current of 13 plus or minus 3 milliamperes (ma.) direct-current flowing through five turns is sufficient to change the remanent state of that core. The static coercivity thus is approximately equal to $5\times13=65$ milliampere-turns. Using conventional coincident-current selection techniques, a current of approximately 8 ma. applied to the row and column windings 18 and 20 of one of the cores 16 is sufficient to change the remanent state of the one core 16 in about 2.0 microseconds. Thus, each of the applied currents generates a magnetizing force of $8\times5=40$ milliampere turns, or approximately ⅔ that of the coercivity of a core 16. With a pulse schedule as shown in Fig. 9 herein, currents of 180 milliamperes and 0.1 microsecond duration were applied to the row and column windings of the selected core 16. Thus, each selecting pulse generated at M.M.F. of $180\times5=900$ milliampere-turns, or approximately 14 times that of the static coercivity of a core 16. Each of the non-selected cores 16 in the row and column receiving the 180 milliampere pulses remained in its initial remanent state. The selected core 16 received a total M.M.F. of $2\times900=1800$ milliampere-turns.

Using the pulse schedule shown in Fig. 10, each selecting pulse was a half-sinusoid, 0.1 microsecond wide at its base, and 180 milliamperes peak value. Thus, each selecting pulse generated an M.M.F. of $180\times5=900$ milliampere turns, or approximately 14 times that of the static coercivity of a core 16. A core 16 receiving only the row or only the column pulses remained substantially in its initial remanent state. The position of the column pulse relative to the two row pulses was varied, as described above, and without causing any appreciable effect on the selection of a core 16. The amplitude of the row and column pulses was varied from 180 to 220 ma. The peak amplitudes of the positive and negative selecting pulses were regulated to be within 5% of each other.

Accordingly, in the specific illustrative embodiments, the speed of operation is increased by an order of magnitude over the speed of a certain memory system using coincident current techniques. Note, however, that the memory systems of the present invention require about the same amount of equipment as the prior systems. For example, known magnetic switches furnish successive opposite-polarity selecting pulses used in the schedules illustrated in Figs. 7, 8 and 9 herein.

There have been described herein improved memory systems using rectangular hysteresis loop magnetic cores. Two modes of operating memory systems are described. One of these modes $H_2$ can be explained in terms of domain-wall movement. Another of these modes can be explained in terms of "spin rotation." Both these modes use excitations that exceed the static coercive force of the cores by many times, say 10 or more times. Accordingly, relatively short-duration selecting pulses having correspondingly larger amplitudes can be employed, thereby decreasing the time required to select a desired core of a memory array, and without requiring an appreciable increase in equipment.

What is claimed is:

1. The combination of an element of substantially rectangular hysteresis loop material having two remanent states, first and second windings linked to said element, first pulse source means for applying to said first winding a first selecting pulse, and second pulse source means for applying to said second winding another selecting pulse, each of said pulses being of such amplitude as to generate a magnetizing force in excess of the static coercive force of said element, and each of said pulses of itself being of insufficient time duration to effect a change in the remanent state of said element.

2. The combination of an element of substantially rectangular hysteresis loop material having two remanent states, first and second windings linked to said element, first pulse source means for applying to said first winding selecting pulses, and second pulse source means for applying to said second winding other selecting pulses, certain of said first winding selecting pulses being of one polarity and the others of said first winding selecting pulses being of the opposite polarity, certain of said second winding selecting pulses being of one polarity and the others of said second winding selecting pulses being of opposite polarity, each of said pulses being of such an amplitude as to generate a magnetizing force in excess of the static coercive force of said element, and each of said pulses of itself being of insufficient time duration to effect a change in the remanent state of said element.

3. The combination of an element of substantially rectangular hysteresis loop material having two remanent states, first and second windings linked to said element, first pulse source means for applying to said first winding two or more spaced pulses, and second pulse source means for applying to said second winding one or more spaced pulses, each of said pulses being of such an amplitude as to generate a magnetizing force in excess of the static coercive force of said element, said first winding pulses being ineffective to change the state of said element in the absence of the said second winding pulses.

4. The combination of an element of substantially rectangular hysteresis loop material having two remanent states, first and second windings linked to said element, and means for changing the state of said element comprising first pulse source means for applying to said first winding three spaced pulses, and second pulse source means for applying to said second winding two spaced pulses interlaced in time with the pulses applied to said first winding, said element not changing state when either said first winding pulses or said second winding pulses alone are applied and changing state when both said first and second winding pulses are applied.

5. The combination of an element of substantially rectangular hysteresis loop material having two remanent states, first and second windings linked to said element, first pulse source means for applying to said first winding three spaced pulses, and second pulse source means for applying to said second winding two spaced pulses interlaced in time with the pulses applied to said first winding, each of said pulses being of an amplitude so as to generate a magnetizing force in excess of the static coercive force of said element, and each of said pulses of itself being of insufficient time duration to effect a change in the remanent state of said element.

6. In a memory system, the combination of two elements of substantially rectangular hysteresis loop material, each of said elements having two states, one winding coupled to both said elements, two other windings each coupled to a different one of said elements, and means for changing the state of a desired one and not the other of said elements comprising first pulse source means for applying two or more spaced pulses to said one winding, and second pulse source means for applying one or more pulses to that one second winding coupled to said desired element, said second winding pulses being interlaced in time with said one winding pulses, and each of said first and second winding pulses being of an amplitude so as to generate a magnetizing force in excess of the static coercive force of said elements, whereby said first and second winding pulses operate to change the state of only said desired element.

7. The combination of an element of substantially rectangular hysteresis loop material having two remanent states, first and second windings linked to said element, first pulse source means for applying to said first winding a succession of spaced pulses, and second pulse source means for applying to said second winding another pulse, said other pulse being initiated and terminated at any time during the time interval between the initiation of the first pulse of said succession and the termination of the last pulse of said succession, each of said pulses being of an amplitude so as to generate a magnetizing force in excess of the static coercive force of said element, and each of said succession of pulses and said other pulse of itself being of insufficient time duration to effect a change in the remanent state of said element.

8. The combination of an element of substantially rectangular hysteresis loop magnetic material having two remanent states, first, second and third windings linked to said element, first pulse source means for applying to said first winding spaced pulses of one polarity and means for applying to said second winding other spaced pulses of said one polarity, and second pulse source means for applying to said third winding pulses of the polarity opposite the one polarity coincidentally with said one polarity pulses applied to said second winding, each of said pulses being of an amplitude so as to generate a magnetizing force in excess of the static coercive force of said elements, and each of said pulses of itself being of insufficient time duration to effect a change in the remanent state of said element.

9. The combination of an element of substantially rectangular hysteresis loop material, said element having two states, first and second windings linked to said element, first pulse source means for applying to said first winding two opposite-polarity pulses, second pulse source means for applying to said second winding two opposite-polarity pulses, one of said pulses applied to said first winding being substantially coincident with a corresponding polarity pulse applied to said second winding, the others of said pulses applied to said first and second windings being non-coincident with each other, each of said pulses being of an amplitude so as to generate a magnetizing force sufficient to produce an irreversible magnetization change in said element, and each of said pulses of itself being of insufficient time duration to change said element from one to the other of said states, said coincident pulses together changing said element to said other state, and one of said non-coincident pulses substantially cancelling any magnetization changes produced by the preceding non-coincident pulse.

10. A magnetic system comprising three cores of substantially rectangular hysteresis loop material, a first winding linked to a first pair of said cores, and a second winding linked to the other pair of said cores, and means for changing the state of the core common to both said pairs comprising first pulse source means for applying a group of pulses to said first winding, and second pulse source means for applying another group of pulses to said second winding, the pulses of said second group being interlaced in time with those of said first group, whereby the state of the core common to both said pairs is changed and the states of the remaining cores of said pairs are not changed.

11. A magnetic system comprising three cores of substantially rectangular hysteresis loop material, a first winding linked to a first pair of said cores, and a second winding linked to the other pair of said cores, and means for changing the state of the core common to both said pairs comprising first pulse source means for applying a group of pulses to said first winding, and second pulse source means for applying another group of pulses to said second winding, the pulses of said second group being interlaced in time with those of said first group, each of said pulses generating a magnetizing force in excess of the static coercive force of any of said cores, the pulses of any one of said groups having a duration and spacing such that any core to which only one of said pulse groups is applied has only reversible magnetization changes produced therein.

12. A magnetic storage device comprising a plurality of magnetic elements of substantially rectangular hysteresis loop material, said elements being aranged in groups, each of said elements being common to different ones of said groups, separate excitation means for each of said groups, and means for selecting a desired one of said elements comprising first pulse source means for applying to the excitation means of one group including said desired element two or more separate selecting signals, each said selecting signal being of an amplitude so as to generate a magnetizing force in excess of the static coercive force of any core of said one group, and second pulse source means for applying to the excitation means of another group including said desired element two or more separate selecting signals, each of said last-mentioned selecting signals being of an amplitude so as to generate a magnetizing force in excess of the static coercive force of any core of said other group, and each of said selecting signals being of insufficient time duration to effect a change in the remanent state of any element and said separate groups of selecting signals together producing a net signal of sufficient amplitude and duration to change the state of said desired element.

13. A magnetic system comprising three elements of substantially rectangular hysteresis loop material, a first winding linked to one pair of said elements, a second winding linked to the other pair of said elements, means for selectively changing the state of the element common to both of said pairs comprising first pulse source means for applying to said first winding first and second pulses of respectively opposite polarities, second pulse source means for applying to said second winding first and second pulses of respectively opposite polarities, each of said pulses, when applied, generating a magnetizing force in excess of the static coercive force of any of said cores, one of said first and second first winding pulses being made substantially coincident with a corresponding one of said second winding pulses and the other of said first and second winding pulses being staggered relative to each other.

14. In a magnetic memory system, a three-dimensional array of magnetic elements, said array including a plurality of two-dimensional arrays of magnetic elements arranged in rows and columns, a different row winding linking all the elements in corresponding rows of said arrays, a different column winding linking all the elements in corresponding columns of said arrays, a separate winding linking all the elements in each different one of said two-dimensional arrays, means for selecting a group of elements located in corresponding positions in said arrays comprising first pulse source means for applying selecting signals to the row winding linked to said group of elements, and second pulse source means for applying other selecting signals to the column windings linked to said group of elements, each of said selecting signals, when applied, generating a magnetizing force in excess of the static coercive force of any of said elements, and each of said signals producing only reversible magnetization changes in any non-selected elements to which said signals are applied.

15. In a magnetic system, the combination as claimed in claim 14 including means for selecting desired elements of said group comprising third pulse source means for applying still other selecting signals to said separate windings of said two-dimensional arrays including said desired elements, said last-mentioned selecting signals each being of a polarity opposite to those of the selecting signals applied to any one of said row and column windings.

16. A magnetic system comprising a plurality of magnetic cores of substantially rectangular hysteresis loop material and each having two remanent states, said cores being arranged in coordinate groupings, a plurality of coordinate lines intersecting said cores, each said core being identified by a different plurality of said lines, and means for selecting a desired one of said cores comprising first pulse source means for applying to one of said lines intersecting in said desired core a first group of one or more pulses, and second pulse source means for applying to another of said lines intersecting in said desired core a second group of one or more pulses, each of said pulses of said first and second groups producing, when applied, a magnetizing force in excess of the static coercive force of any of said cores, said pulses having a duration and spacing in time such that the remanent state of any core to which only one of said pulse groups is applied is substantially the same as that preceding the application of said pulse groups, and said desired core is changed from an initial to the opposite one of said states.

17. In a magnetic system having a two-dimensional array of magnetic elements arranged in rows and columns, a separate row winding linked to each different row of said elements, a separate column winding linked to each different column of said elements, means for selecting a desired element of said array comprising first pulse source means for applying a plurality of pulses to the one row winding linked to said desired element, second pulse source means for applying another plurality of pulses to the one column winding linked to said desired element, each of said pulses, when applied, generating a magnetizing force in excess of the static coercive force of any of said elements, and each of said row and column winding pulses being spaced relative to each other so as to produce no appreciable magnetization changes in the non-selected elements of said row and column of elements linked by the said one row and column windings.

18. In a magnetic system, apparatus as described in claim 17, wherein said row winding pulses include three spaced pulses of one polarity and said column winding pulses include two spaced pulses of said one polarity, said column pulses being interlaced with said row pulses.

19. In a magnetic system, apparatus as described in claim 17, wherein said row winding pulses include two pulses of respectively opposite polarities and said column winding pulses include pulses of respectively opposite polarities, one of said row winding pulses being coincident with one of said column winding pulses and the others of said row and column winding pulses being non-coincident with each other.

20. In a magnetic system, apparatus as described in claim 17, wherein said row winding pulses include two respectively opposite polarity pulses and said column winding pulses include two respectively opposite polarity pulses, corresponding polarity pulses of said row and column winding pulses being substantially coincident with each other.

21. In a magnetic system, apparatus as described in claim 17, wherein said row winding pulses include two pulses of one polarity, said column winding pulses include a single pulse of said one polarity and said column winding pulse being interlaced with said row winding pulses.

References Cited in the file of this patent

UNITED STATES PATENTS

| | | |
|---|---|---|
| 2,709,248 | Rosenberg | May 24, 1955 |
| 2,736,880 | Forrester | Feb. 28, 1956 |
| 2,740,949 | Counihan et al. | Apr. 3, 1956 |
| 2,784,391 | Rajchman | Mar. 5, 1957 |
| 2,808,578 | Goodell | Oct. 1, 1957 |

UNITED STATES PATENT OFFICE

CERTIFICATE OF CORRECTION

Patent No. 2,933,720 April 19, 1960

Vernon L. Newhouse et al.

It is hereby certified that error appears in the printed specification of the above numbered patent requiring correction and that the said Letters Patent should read as corrected below.

Column 6, line 66, after "first" insert -- array --; column 8, lines 68 and 69, for "respectice" read -- respective --; column 10, line 50, for "materails" read -- materials --; column 11, line 34, for "advantage" read -- advantages --.

Signed and sealed this 27th day of September 1960.

(SEAL)
Attest:

KARL H. AXLINE
Attesting Officer

ROBERT C. WATSON
Commissioner of Patents